United States Patent
Mohan et al.

(10) Patent No.: US 12,204,886 B2
(45) Date of Patent: Jan. 21, 2025

(54) SYSTEM AND METHOD FOR MANAGING CLOUD DEPLOYMENT CONFIGURATION FILES AND CONTAINER BASE IMAGES

(71) Applicant: Cognizant Technology Solutions India Pvt. Ltd., Chennai (IN)

(72) Inventors: Karthikeyan Mohan, Chennai (IN); Duraivel Kalyanasundaram, Chennai (IN); Rangarajan Ramadass, Chennai (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 71 days.

(21) Appl. No.: 18/095,565

(22) Filed: Jan. 11, 2023

(65) Prior Publication Data

US 2024/0168744 A1    May 23, 2024

(30) Foreign Application Priority Data

Nov. 23, 2022  (IN) .............................. 202241067342

(51) Int. Cl.
*G06F 9/455* (2018.01)
*G06F 8/61* (2018.01)
(Continued)

(52) U.S. Cl.
CPC .................. *G06F 8/63* (2013.01); *G06F 8/65* (2013.01); *G06F 8/75* (2013.01)

(58) Field of Classification Search
CPC ..... G06F 8/63; G06F 8/65; G06F 8/75; G06F 8/61; G06F 9/45558; G06F 9/45533;
(Continued)

(56) References Cited

U.S. PATENT DOCUMENTS 8,255,529 B2 * 8/2012 Ferris .................. G06F 11/3495
                                                       709/224
9,665,366 B2    5/2017 Kuchibhotla
(Continued)

OTHER PUBLICATIONS

Amazon Web Services—Infrastructure as Code, https://d1.awsstatic.com/training-and-certification/docs-devops-pro/infrastructure-as-code.pdf; Publication date: Jul. 2017.
(Continued)

*Primary Examiner* — Thuy Dao
(74) *Attorney, Agent, or Firm* — CANTOR COLBURN LLP

(57) ABSTRACT

A system and a method for managing cloud deployment configuration files and container base images for applications is provided. One or more application source code associated with configuration files and container images of applications are analyzed based on one or more pre-defined rule sets for determining cloud platform best-practice violations associated with the application source code. Further, impact on the application source code due to cloud platform changes is identified based on one or more search sets. Further, one or more remediation actions are executed for rectifying the determined cloud platform best-practice violations associated with the impacted application source code based on one or more remediation types. Base images of the container images are validated to be secure and without vulnerabilities. Lastly, a test run is triggered to determine that the remediation actions have not removed functionalities associated with the application source code.

31 Claims, 12 Drawing Sheets

(51) Int. Cl.
  *G06F 8/65* (2018.01)
  *G06F 8/75* (2018.01)
  *G06F 9/445* (2018.01)
  *G06F 9/48* (2006.01)
  *G06F 9/50* (2006.01)
  *G06F 15/16* (2006.01)
  *H04L 67/10* (2022.01)

(58) Field of Classification Search
  CPC . G06F 8/60; G06F 40/47; G06F 40/58; G06F 9/45512; G06F 16/173; G06F 9/454; G06F 8/71; G06F 9/541; H04L 67/34; H04L 67/10
  See application file for complete search history.

(56) References Cited

U.S. PATENT DOCUMENTS

| | | | |
|---|---|---|---|
| 10,540,452 B1 * | 1/2020 | Andrews | G06F 40/47 |
| 11,861,342 B2 * | 1/2024 | Shah | H04L 67/10 |
| 2015/0199197 A1 | 7/2015 | Maes | |

OTHER PUBLICATIONS

AWS Whitepaper, Overview of Amazon Web Services, https://docs.aws.amazon.com/pdfs/whitepapers/latest/aws-overview/aws-overview.pdf#management-governance; Publication date: Jun. 3, 2022.
Microsoft Learn, Create Azure Advisor Alerts on New Recommendations Using Azure Portal, https://docs.microsoft.com/en-US/azure/advisor/advisor-alerts-portal; Publication date: Jan. 3, 2022.

* cited by examiner

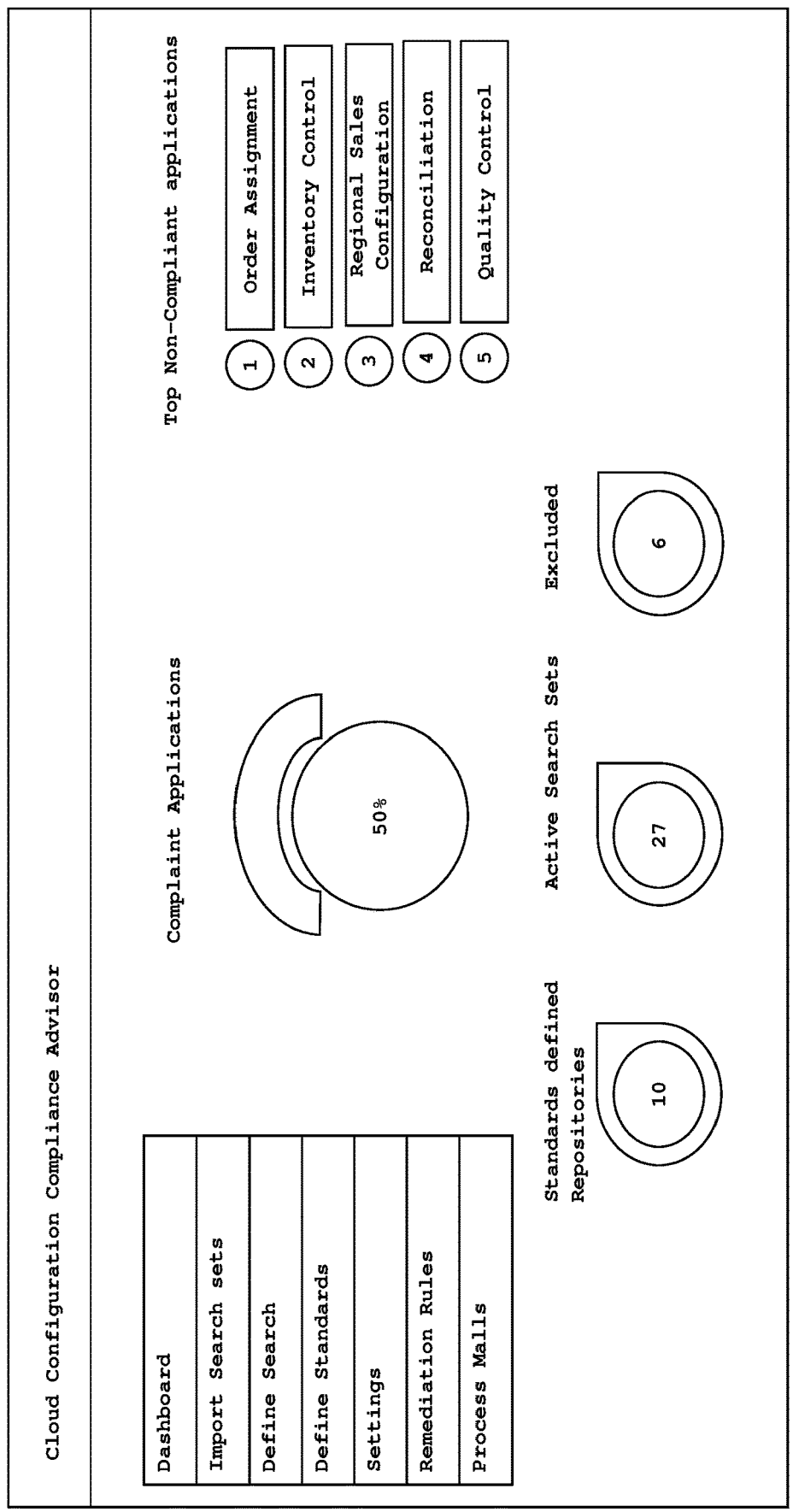
Fig:2

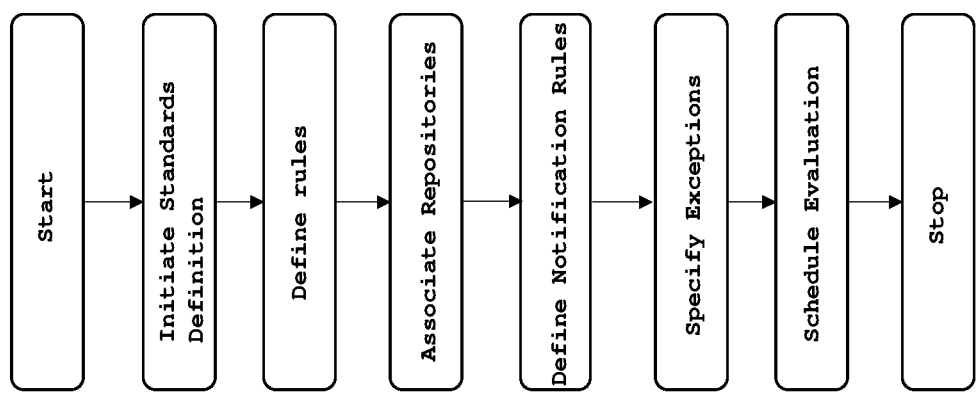

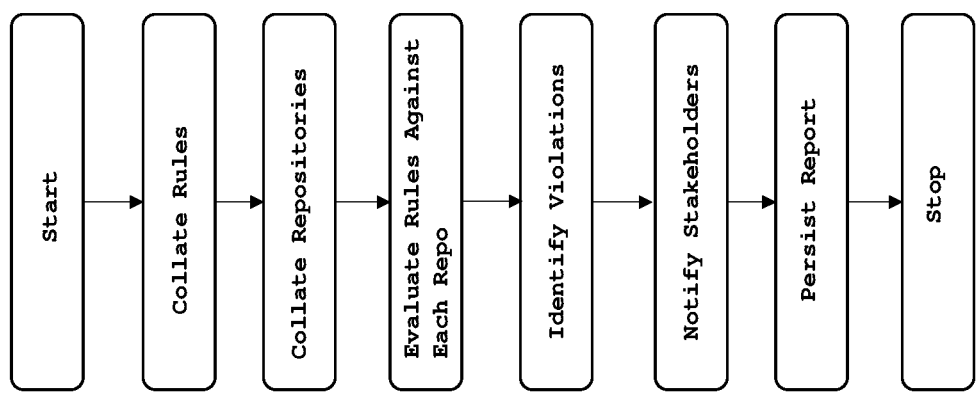
Fig: 3b

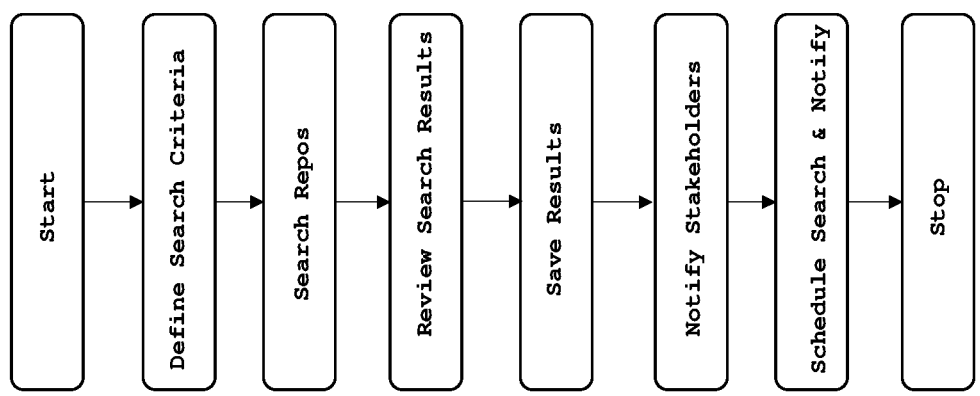
Fig: 3c

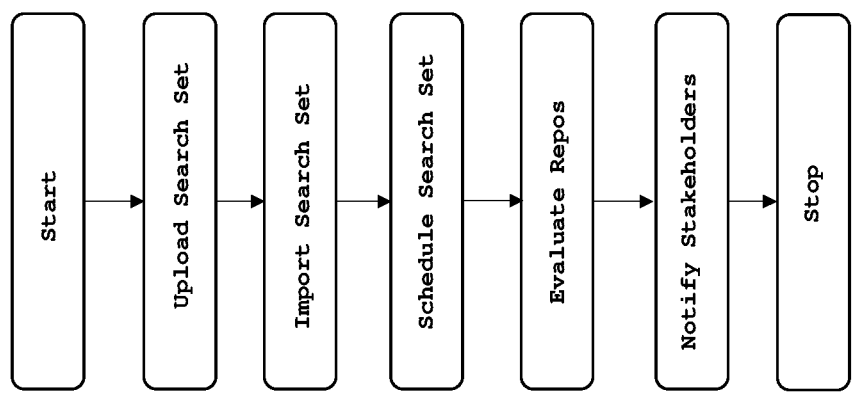
Fig: 3d

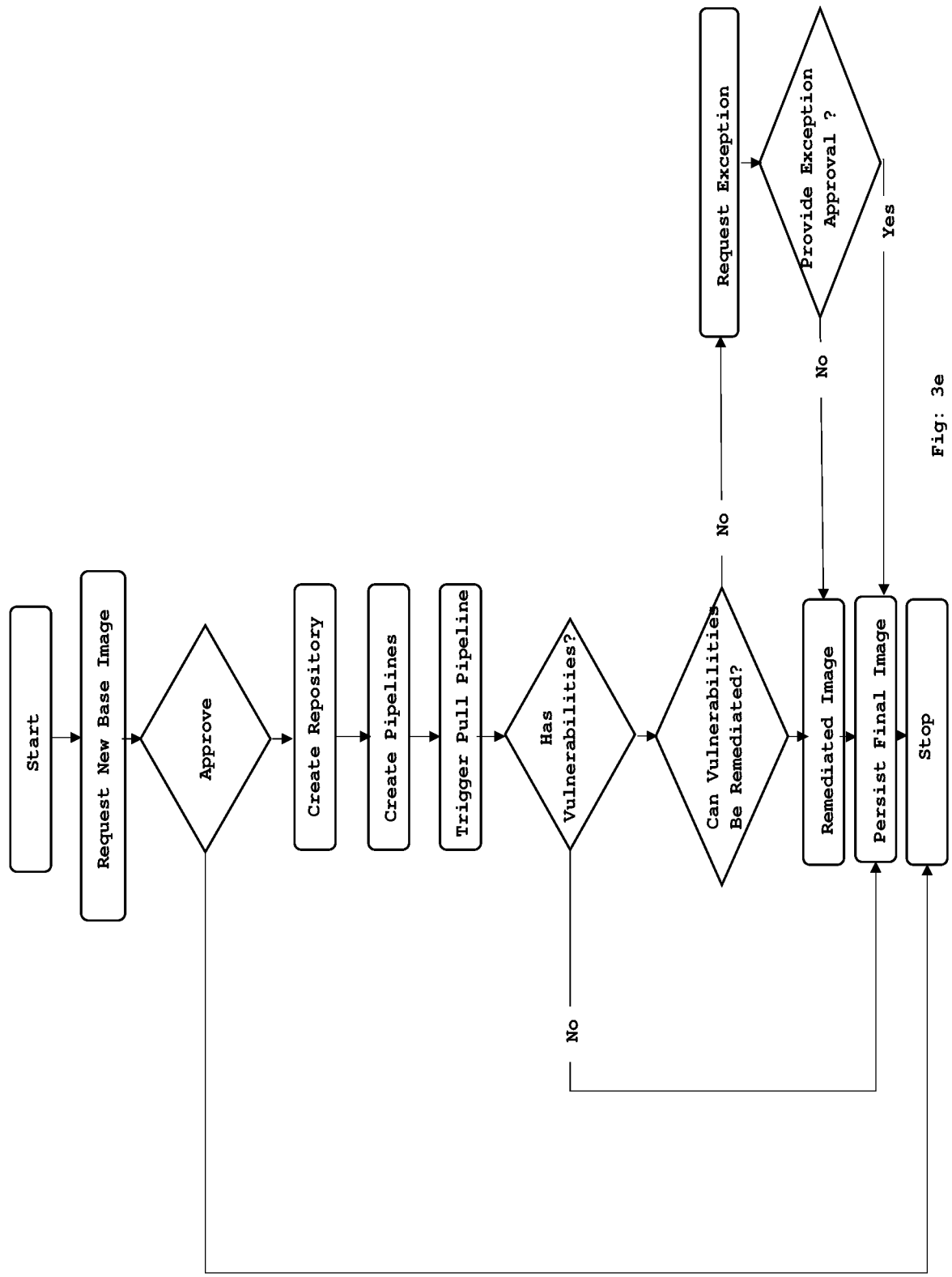
Fig: 3e

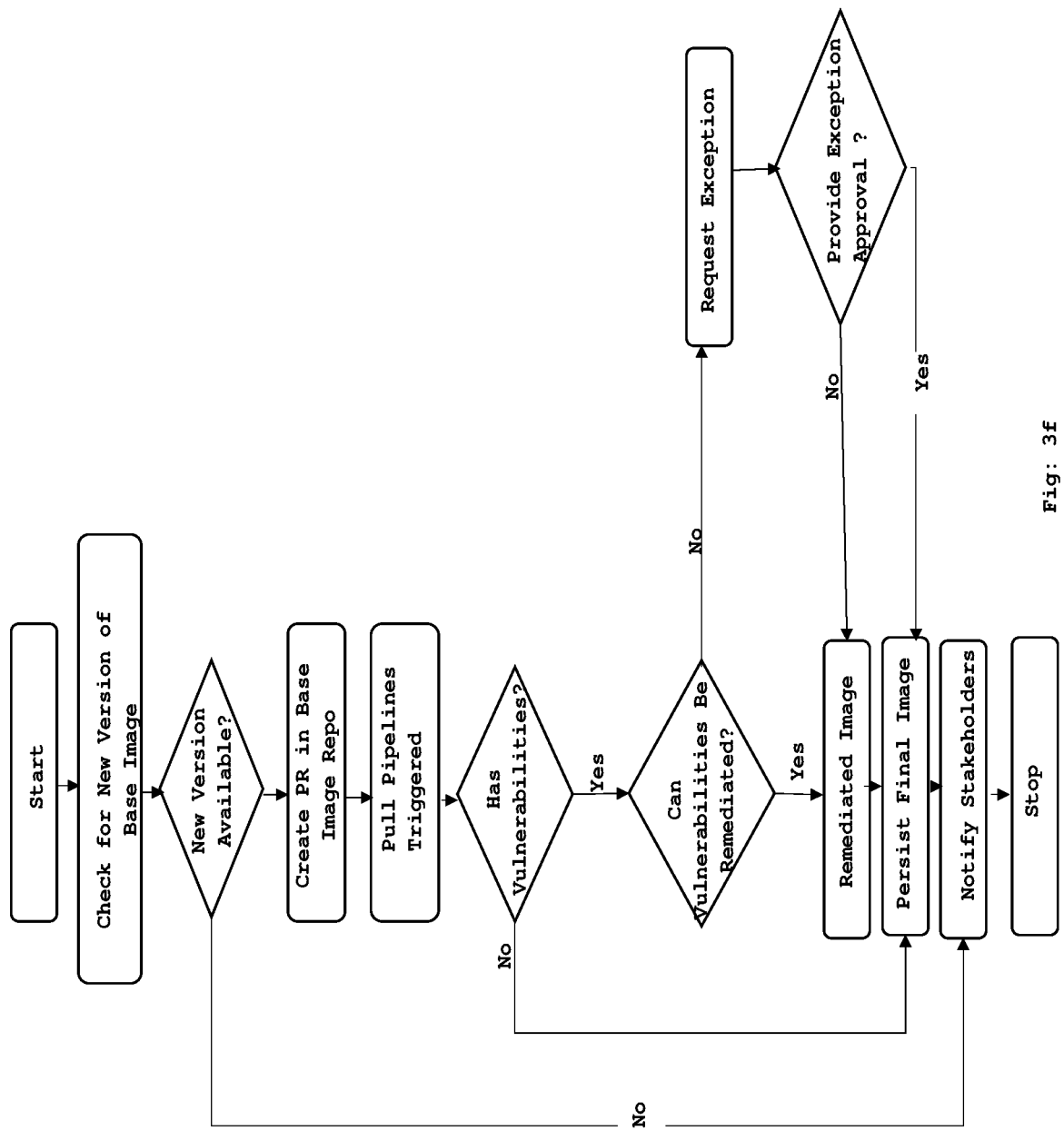
Fig: 3f

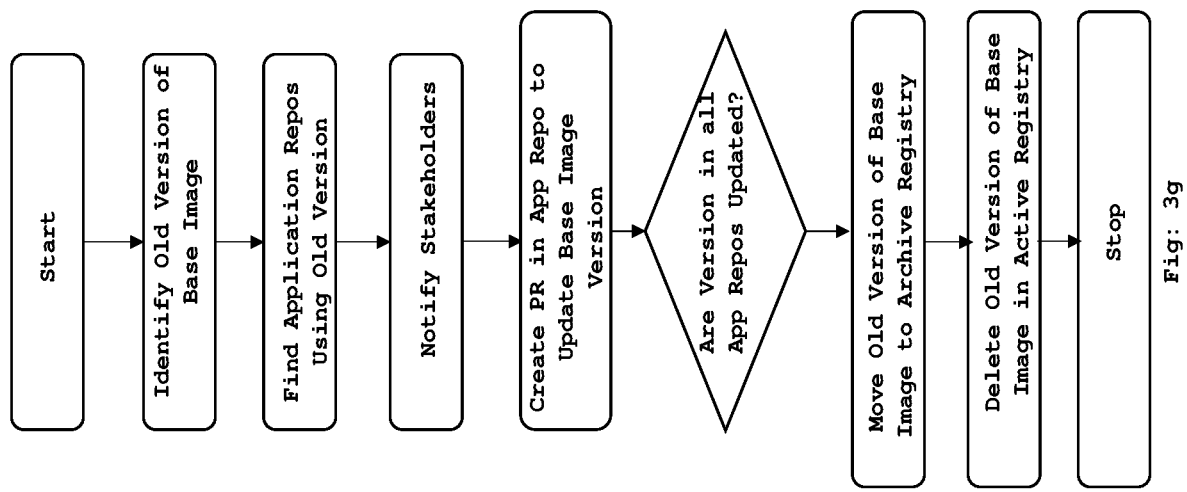
Fig: 3g

SYSTEM AND METHOD FOR MANAGING CLOUD DEPLOYMENT CONFIGURATION FILES AND CONTAINER BASE IMAGES

CROSS REFERENCE TO RELATED APPLICATION

This application is related to and claims the benefit of Indian Patent Application Number 202241067342 filed on Nov. 23, 2022, the contents of which are herein incorporated by reference in their entirety.

FIELD OF THE INVENTION

The present invention relates generally to the field of managing cloud deployment best-practices. More particularly, the present invention relates to a system and a method for automatically managing cloud deployment configuration files and container base images associated with the applications.

BACKGROUND OF THE INVENTION

In the current scenario, various organizations deploy applications that run in their data centers to cloud platforms. Deployment of applications to cloud platforms is associated with new configurations and source codes (e.g., Dockerfile, Kubernetes® deployment YAMLs, Service Mesh YAMLs, etc.) which are required to run the applications in the cloud platform and is carried out based on configuration files and container images associated with the applications. The new configurations are impacted by events, issues and changes made by cloud platform providers. It has been observed that organizations do not have visibility and control over the new configurations for individual applications. Further, ensuring cloud platform deployment for the applications in the organization involves a lot of manual effort and consumes a lot of time, which is error-prone and uncertain. For example, if a Docker® platform assigns a rate limit on images which are extracted from Docker® hub, then the organizations have to determine which applications are using images from the Docker® hub. Further, it is to be determined whether cloud platform providers send periodic notifications associated with issues and fixes to their infrastructure and official images. Overall, organizations need to analyze impact on their applications and take remedial actions in a time bound manner.

Typically, organizations are not able to implement or enforce best practices related to management of cloud platform deployment configuration files and container base images (e.g., base images specified in Docker® file in all applications need to come from an organization's registry,) associated with the applications. Further, it has been observed that existing techniques for checking cloud platform deployment configuration files and container images are associated with various drawbacks. Also, existing techniques do not analyze cloud deployment configuration files associated with applications, rather they analyze generated artifacts, which might result in loss of information (e.g., existing techniques analyze container images for vulnerabilities and does not detect the base image that was used). Further, existing techniques do not provide the capability to the organizations to define their own standards relating to cloud platform deployment configuration files and container images. Furthermore, organizations are not able to quickly respond to bug fix advisories or errata from cloud service providers related to cloud platform deployment configuration files and container images. Furthermore, existing techniques do not analyze issues related to containerization and cloud platform adoption of applications and do not provide centralized management of cloud platform deployment configuration files.

Further, cloud deployment of applications is conventionally carried out by packaging applications in containers, which involves creation of the configuration file to build the container. Typically, the configuration files comprise a base image used to build the container image for the application. The base image is pulled from a default container registry if the registry is not explicitly specified. The base images may also be hosted in other container registries. However, using these base images directly from their source registries are fraught with multiple risk factors. The risk factors comprise, base image being compromised at the source, i.e., in the source container registry due to a cyber-attack, which may result in a vulnerable container image, if the application's container image is built based on a compromised base image. Also, the base image itself may have some known vulnerabilities. Further, when the application's container image is built, the base image pulled from its source registry may reside outside the organization's network, thereby increasing the risk factor. Also, organizations may have defined additional requirements related to security and standardization to ensure stable and secure base images, which cannot be implemented if the base image is fetched directly from the source registry. Yet further, there may be a scenario, in which the base image has been published by an individual and it is not being maintained any more or has been removed from the source, then the application's container image may not be sustained adequately.

In light of the aforementioned drawbacks, there is a need for a system and a method which provides for automatically managing cloud platform deployment configuration files and container base images associated with applications. There is a need for a system and a method which provides for efficient management of cloud platform deployment configuration files and container base images associated with applications. Further, there is a need for a system and a method which provides capability to the organizations to define their own standards relating to cloud platform deployment configuration files and container base images. Furthermore, there is a need for a system and a method which provides for centralized management of cloud platform deployment configuration files and container images by the organization. Yet further, there is a need for a system and a method which provides for secure management of container base images.

SUMMARY OF THE INVENTION

In various embodiments of the present invention, a system for managing cloud deployment configuration files and container base images for applications is provided. The system comprises a memory storing program instructions, a processor executing program instructions stored in the memory and a cloud platform deployment management engine executed by the processor. The cloud platform deployment management engine is configured to analyze one or more application source code associated with configuration files and container images of applications based on one or more pre-defined rule sets for determining cloud platform best-practice violations associated with the application source code. Further, the cloud platform deployment management engine is configured to identify impact on the application source code due to cloud platform changes based on one or more search sets. Further, the cloud platform deployment management engine is configured to execute one or more remediation actions for rectifying the determined cloud platform best-practice violations associated with the impacted application source code based on one or more remediation types. Base images of the container images are validated to be secure and without vulnerabilities. Lastly, the cloud platform deployment management engine is configured to trigger a test run to determine that the remediation actions have not removed functionalities associated with the application source code.

In various embodiments of the present invention, a method for automatically managing cloud deployment configuration files and container base images for applications is provided. The method is implemented by a processor executing instructions stored in a memory. The method comprises analyzing one or more application source code associated with configuration files and container images of applications based on one or more pre-defined rule sets for determining cloud platform best-practice violations associated with the application source code. Further, the method comprises identifying impact on the application source code due to cloud platform changes based on one or more search sets. Further, the method comprises executing one or more remediation actions for rectifying the determined cloud platform best-practice violations associated with the impacted application source code based on one or more remediation types. Base images of the container images are validated to be secure and without vulnerabilities. Lastly, the method comprises triggering a test run to determine that the remediation actions have not removed functionalities associated with the application source code.

In various embodiments of the present invention, a computer program product comprising a non-transitory computer-readable medium having computer program code stored thereon, the computer-readable program code comprising instructions that, when executed by a processor, causes the processor to analyze one or more application source code associated with configuration files and container images of applications based on one or more pre-defined rule sets for determining cloud platform best-practice violations associated with the application source code. Further, impact on the application source code due to cloud platform changes is identified based on one or more search sets. Further, one or more remediation actions are executed for rectifying the determined cloud platform best-practice violations associated with the impacted application source code based on one or more remediation types. Base images of the container images are validated to be secure and without vulnerabilities. Lastly, a test run is triggered to determine that the remediation actions have not removed functionalities associated with the application source code.

BRIEF DESCRIPTION OF THE ACCOMPANYING DRAWINGS

The present invention is described by way of embodiments illustrated in the accompanying drawings wherein:

FIG. 2 illustrates an actionable user interface (UI) rendered on a user device, in accordance with an embodiment of the present invention;

FIGS. 3a to 3d illustrate workflows associated with management of cloud deployment configuration files of the application source code, in accordance with an embodiment of the present invention;

FIGS. 3e to 3g illustrate workflows associated with base image management scenarios, in accordance with an embodiment of the present invention;

DETAILED DESCRIPTION OF THE INVENTION

The present invention discloses a system and a method which provides for automatically managing cloud platform deployment configuration files and container base images associated with applications (i.e., which are used for deploying applications to cloud). The present invention provides for a system and a method that validates and enforces compliance with standards relating to cloud platform deployment configuration files and container base images, defined by the organizations. The present invention provides for a system and a method for quickly responding to bug fix advisories or errata from cloud platform providers related to cloud platform deployment configuration files and container base images. Further, the present invention provides for a system and a method for centralized management of cloud platform deployment configuration files and container base images by the organization. Furthermore, the present invention provides for a system and a method for visualization of best practices associated with cloud platform deployment of applications. Yet further, the present invention provides for a system and a method for maintaining a secured internal registry for container base images. Furthermore, the present invention provides for implementation of automated workflows for onboarding, maintaining the remediated, secured, and standardized container base images hosted in the internal registry for building a container image used in cloud deployment of applications.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the scope of the invention. The terminology and phraseology used herein is for the purpose of describing exemplary embodiments and should not be considered limiting. Thus, the present invention is to be accorded the widest scope encompassing numerous alternatives, modifications, and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
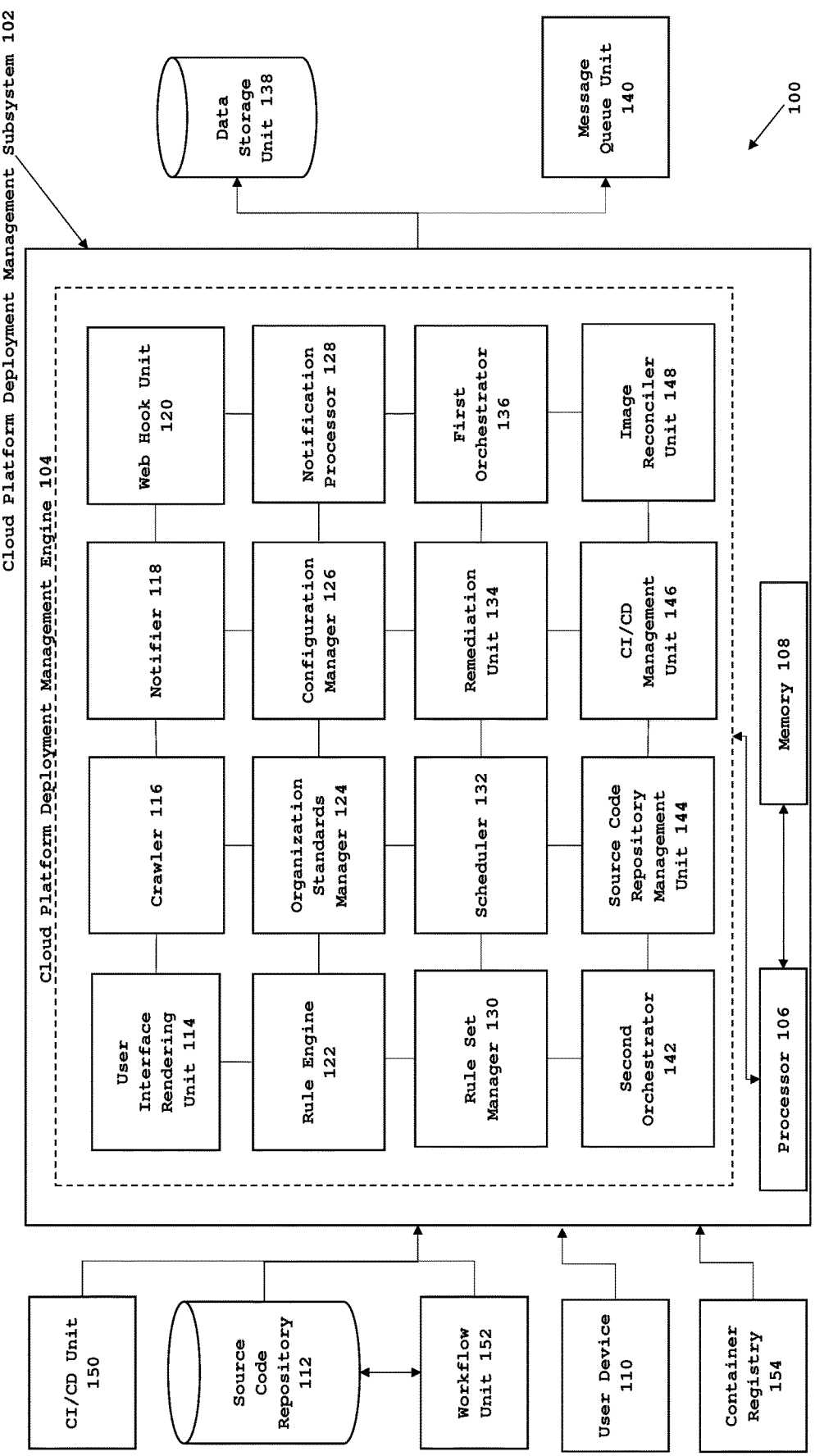
FIG. 1 is a detailed block diagram of a system for automatically managing deployment of configuration files and container images to cloud platform, in accordance with an embodiment of the present invention.

FIG. 1 is a detailed block diagram of a system 100 for automatically managing cloud platform deployment configuration files and container base images, in accordance with various embodiments of the present invention. Referring to FIG. 1, in an embodiment of the present invention, the system 100 comprises a cloud platform deployment management subsystem 102 (subsystem 102), a user device 110, a source code repository 112, a continuous integration/continuous development (CI/CD) unit 150, a workflow unit 152, a data storage unit 138, a message queue unit 140 and a container registry 154. The user device 110, the source code repository 112, the CI/CD unit 150, the workflow unit 152, the data storage unit 138, the message queue unit 140 and the container registry 154 are connected to the subsystem 102 via a communication channel (not shown). The communication channel (not shown) may include, but is not limited to, a physical transmission medium, such as, a wire, or a logical connection over a multiplexed medium, such as, a radio channel in telecommunications and computer networking. The examples of radio channel in telecommunications and computer networking may include, but are not limited to, a local area network (LAN), a metropolitan area network (MAN) and a wide area network (WAN).

The subsystem 102 is configured with a built-in-mechanism for automatically managing cloud platform deployment configuration files and container base images. The subsystem 102 is a self-optimizing system. The subsystem 102 may utilize cognitive techniques such as, but are not limited to, machine learning techniques for automatically managing cloud platform deployment configuration files and container base images. Further, the subsystem 102 automatically implements one or more workflows associated with detecting best practices violation associated with cloud platform deployment configuration files and further managing base images for generating a container image from the container registry 154 in a secure manner. The base images in the container registry 154 are updated regularly by authorized users and other user may only read from the said container registry 154. Updating the container registry 154 with a new base image or updating an existing base image in the container registry 154 is carried by implementing the workflow to ensure security.

In an embodiment of the present invention, the subsystem 102 comprises a cloud platform deployment management engine 104 (engine 104), a processor 106 and a memory 108. In various embodiments of the present invention, the engine 104 has multiple units which work in conjunction with each other for automatically managing cloud platform deployment configuration files and container base images. The various units of the engine 104 are operated via the processor 106 specifically programmed to execute instructions stored in the memory 108 for executing respective functionalities of the units of the engine 104 in accordance with various embodiments of the present invention.

In another embodiment of the present invention, the subsystem 102 may be implemented in a cloud computing architecture in which data, applications, services, and other resources are stored and delivered through shared datacenters. In an exemplary embodiment of the present invention, the functionalities of the subsystem 102 are delivered to a user as Software as a Service (SaaS) over a communication network.

In another embodiment of the present invention, the subsystem 102 may be implemented as a client-server architecture. In this embodiment of the present invention, a client terminal accesses a server hosting the subsystem 102 over a communication network. The client terminals may include but are not limited to a smart phone, a computer, a tablet, microcomputer or any other wired or wireless terminal. The server may be a centralized or a decentralized server.

In an embodiment of the present invention, the engine 104 comprises a user interface rendering unit 114, a crawler 116, a notifier 118, a web hook unit 120, a rule engine 122, an organization standards manager 124, a configuration manager 126, a notification processer 128, a rule set manager 130, a scheduler 132, a remediation unit 134, a first orchestrator 136, a second orchestrator 142, a source code repository management unit 144, a CI/CD management unit 146 and an image reconciler unit 148.

In operation, in an embodiment of the present invention, the user interface rendering unit 114 is configured to render an actionable user interface (UI) via the user device 110, as illustrated in FIG. 2. The user device 110 is an electronic device of a user such as, an administrator, a stakeholder, etc., in the organization. The user device 110 may include, but is not limited to, a computer system, a laptop, a tablet, and a smartphone. The actionable UI renders a dashboard for visualization of one or more operational aspects of engine 104 such as, but are not limited to, managing cloud platform deployment configuration files and container base images and the cloud platform best-practice violations associated with the cloud platform deployment of the applications. The cloud platform best-practice violations are representative of non-compliance of the standards and best practice associated with the cloud platform deployment configuration files of the application source code and management of the container base images. The standards and best-practices associated with the application source code for application deployment to cloud platform are determined by an organization or a cloud platform provider. The standard and best practices may include indicators, such as, base images should not be pulled from a public repository and a deployment should always have health checks enabled. Further, the cloud platform best-practice violations represent aspects of application source code of an application associated with the configuration files and container base images, which are not compatible with best-practice standards of the cloud platform provider. Further, via the actionable UI one or more inputs may be provided for defining one or more criterions that are to be applied for checking the source code repository 112. Further, base images are ingested based on multiple criteria such as, but are not limited to, reliable base image source, and absence of vulnerabilities.

In an embodiment of the present invention, the application source code associated with the cloud platform deployment configuration files and container images of the applications is stored in the source code repository 112 associated with the organization. In an exemplary embodiment of the present invention, the source code repository 112 may include Github® and Gitlab®. In an exemplary embodiment of the present invention, the source code repository 112 may be located at a local location or a remote location with respect to the engine 104. The source code repository management unit 144 is configured to manage pull and push operations carried out for the application source code. In an exemplary embodiment of the present invention, the source code repository management unit 144 may connect to at least Github®, and Apache Subversion® (SVN).

In an embodiment of the present invention, the rule engine 122 is configured to provide one or more pre-defined rule sets, which are used for analyzing the application source code stored in the source code repositories 112. The pre-defined rule sets are used for determining and flagging the cloud platform best-practice violations for the application source code associated with the configuration files and container images. Therefore, the one or more pre-defined rule sets are used for determining the cloud platform best practice violations associated with the application source code. Further, the generated pre-defined rule sets are stored in the data storage unit 138. Further, the pre-defined rule sets are a group of rules specific to the organization. In an embodiment of the present invention, the pre-defined rule sets may be pre-defined based on inputs provided on the actionable UI via the user device 110. In another embodiment of the present invention, the engine 104 defines the pre-defined rule sets in the rule engine 122 by using Machine Learning (ML) techniques. In an example, the pre-defined rule sets analyzing the application source code may relate to, but are not limited to, identifying the applications in which the base image in dockerfile is pulled from docker hub, recognizing one or more issues with deployment which will be used to push applications to upgraded versions of platforms, such as Kubernetes®, that may impact the application source code and may lead to cloud platform best-practice violations.

In an embodiment of the present invention, the notification processor 128 is configured to analyze the emails and alerts, related to cloud platform changes, sent in the form of notifications by the cloud platform provider. The notification processor 128 is a ML based component configured to analyze the received notifications, by using ML techniques, for converting the notifications into the one or more pre-defined rule sets in communication with the rule engine 122. The notification processor 128 operating in communication with the rule engine 122 generates the one or more pre-defined rule sets using the notifications received from the cloud platform provider. In another embodiment of the present invention, the notification processor 128 is configured to communicate with the rule engine 122 for fetching the pre-defined rule sets stored in the data storage unit 138 based on analysis of the notifications received from the cloud platform provider for determining the cloud platform best-practice violations associated with the application source code.

In an embodiment of the present invention, the crawler 116 is configured to communicate with the source code repository 112 for analyzing the application source code stored in the source code repository 112. The crawler 116 is configured to communicate with the source code repository 112 based on at least configurations of the source code repository 112 or an active source code repository 112. In an embodiment of the present invention, the crawler 116 is configured to analyze, at regular time intervals, the application source code stored in the source code repository 112 using the one or more pre-defined rule sets present in the rule engine 122 for determining the cloud platform best-practice violations associated with the application source code. The determined cloud platform best-practice violations are notified to users by the notifier 118 via the user device 110 on the actionable UI.

In an embodiment of the present invention, the rule set manager 130 is configured to manage transmission of the pre-defined rule sets stored in the data storage unit 138 in communication with the rule engine 122 for analyzing the application source code stored in the source code repository 112 and determining the cloud platform best-practice violations associated with the application source code. Advantageously, management of transmission of the pre-defined rule sets aids in pre-defining the pre-defined rule sets once, for reusing across multiple organizations. In an embodiment of the present invention, the organization standards manager 124 is configured to manage grouping of the pre-defined rule sets based on one or more pre-defined criteria. Examples of the pre-defined criteria may include, but are not limited to, a criterion that base images in container-based deployment configuration files may not refer to public container image registries, and a criterion that health check may be enabled for all applications in their respective deployment configuration files.

In an embodiment of the present invention, the configuration manager 126 is configured to communicate with the crawler 116 and the rule engine 122 for controlling functioning of the crawler 116 and the rule engine 122. In an exemplary embodiment of the present invention, the configuration manager 126 defines the periodicity in which the crawler 116 may analyze the source code in the source code repository 112. In another exemplary embodiment of the present invention, the configuration manager 126 specifies the pre-defined rule sets that needs to be applied and if any source code repository 112 needs to be excluded from the analysis. In an embodiment of the present invention, the scheduler 132 is configured to periodically execute search operation on the application source code present in the source code repository 112 based on the pre-defined rule sets stored in the data storage unit 138 in communication with the rule engine 122 for searching and evaluating the pre-defined rule sets based on the determined and flagged cloud platform violations associated with the application source code. In an embodiment of the present invention, the scheduler 132 is configured to invoke the crawler 116 at a pre-defined time-period.

In another embodiment of the present invention, one or more inputs are transmitted via the actionable UI rendered on the user device 110 to the rule engine 122 for generating one or more search sets. For example, the inputs used for generating search sets may include, but are not limited to, file types and Regex for identifying best practice violation associated with the organizational standards for cloud deployment of the applications. The search sets are rules defined to identify application source code associated with the best practice violations caused by cloud platform changes, which are initiated by the cloud platform provider. Thus, impact on the application source due to cloud platform changes is identified based on one or more search sets. The cloud platform changes may include, but are not limited to, cloud platform infrastructure changes, bug fixes and errata. The cloud platform change is generally notified to the user in the organization by the cloud platform provider using one or more notification modes such as, but are not limited to, email and alerts in a cloud platform provider's portal. Further, the generated one or more search sets are stored in the data storage unit 138.

In an embodiment of the present invention, the remediation unit 134 is configured to execute one or more remediation actions on the application source code associated with the configuration files and container images with respect to the determined cloud platform best-practice violations associated with the impacted application source code for rectifying the determined cloud platform best-practice violations. For example, the remediation actions may include, but are not limited to, search for container-based cloud platform deployment configuration file in which the base image is referring to a public registry, identify an equivalent base image in the internal registry and update the configuration file. In an embodiment of the present invention, the remediation action is provided based on one or more remediation types associated with the remediation action, which are generated by the remediation unit 134 and stored in the data storage unit 138. The remediation types represent the execution of the one or more remediation actions. In an embodiment of the present invention, the remediation unit 134 is configured to automatically execute the remediation action on the application source code for rectifying the determined cloud platform best practice violations associated with the application source code. In another embodiment of the present invention, the remediation unit 134 provides remediation action on the actionable UI via the user device 110 for visualization and the remediation action may be suitably carried out for rectifying the determined cloud platform best-practice violations associated with the application source code. In an embodiment of the present invention, the remediation action is applied directly to the application source code for rectifying the determined cloud platform best-practice violations associated with the application source code.

Further, in an embodiment of the present invention, the remediation unit 134 is configured to fetch the application source code associated with cloud platform best-practice violations from the source code repository 112 for remediating the cloud platform best-practice violations associated with the application source code. The application source code associated with cloud platform best-practice violations are fetched from the source code repository 112 based on a pull request generated by the users via the source code repository 112 and communicated through the web hook unit 120. Further, based on the pull request, the application source code associated with cloud platform best-practice violations are fetched by the remediation unit 134 from the source code repository 112. Further, the remediation action is applied by the remediation unit 134 on the fetched application source code for rectifying the cloud platform best-practice violations associated with the application source code and a status regarding 'success' or 'no success' of application of the remediation action is generated and sent to the actionable UI on the user device 110 for visualization by the user in the organization. Advantageously, visualization of the rectification status aids in maintaining quality of the remediation action. In another embodiment of the present invention, in the event changes are made to the application source code by the user, the web hook unit 120 is invoked whenever a pull request in the source code repository 112 is generated by the user. The web hook unit 120 facilitates communication between the source code repository 112 and the first orchestrator 136. The first orchestrator 136 is configured to trigger a test run to determine that the changes made to the application source code based on the remediation action, have not removed any functionality associated with the application source code. Further, the test run may be executed to verify the cloud platform deployment configuration, and to determine if any of the best-practices have been violated or not.

In another embodiment of the present invention, the first orchestrator 136 is configured to manage operation of various units of the engine 104 for adequate functioning. The first orchestrator 136 manages operations such as, but are not limited to, scanning of the source code repository 112 regularly to ensure that the organization standards are adhered to, managing ad-hoc application source code search initiated by the engine 104, managing the generated rule sets. Further, in an embodiment of the present invention, the first orchestrator 136 is configured to communicate with the message queue unit 140 for managing operation of various units of the engine 104. The first orchestrator 136 in communication with the message queue unit 140 sends instructions asynchronously to various units of the engine 104 for managing operation of various units of the engine 104. Further, units of the engine 104 operate on the instructions based on the workload and respond to the instructions from the first orchestrator 136. For example, the first orchestrator 136 may, based on a schedule, send instructions to the crawler 116 to pull the application source code from the source code repository 112 and scan it for the cloud platform best-practice violations.

In an embodiment of the present invention, the CI/CD unit 150 is configured to create a pipeline to validate the base image prior to storing the container base images in the container registry (154). The base images are validated by scanning to check if there are any vulnerabilities associated with the base images using tools such as, but not limited to, Snyk®, and Clair®. In an exemplary embodiment of the present invention, the CI/CD unit 150 uses one or more tools such as, Jenkins®, Spinnaker®, Tekton®, Concourse®, Bamboo®, etc., to carry out CI/CD operations such as create, modify, and trigger pipelines in the CI/CD unit 150. In an embodiment of the present invention, the CI/CD management unit 146 is configured to manage various CI/CD operations.

In an embodiment of the present invention, the image reconciler unit 148 is configured to update application source code versions of the existing application source code in the source code repository 112 and trigger the workflow when the application source code is updated with a new version. In another embodiment of the present invention, the image reconciler unit 148 is configured to manage updates of the base images in the container registry 154.

In an embodiment of the present invention, the workflow unit 152 is configured to implement one or more workflows for determining cloud platform best-practice violations or best-practices violations associated with application source code, of the cloud platform deployment configuration files, in the source code repository 112 and management of the container base images present in the container registry 154. The second orchestrator 142 is configured to manage implementation of the one or more workflows. In an embodiment of the present invention, the second orchestrator 142 is configured to manage implementation of the workflows via the UI. In an embodiment of the present invention, the workflow unit 152 is configured to further manage updates of the application source code in the source code repository 112 based on implementation of the workflows. Further, the workflow unit 152 is configured to use one or more tools such as, but are not limited to, service Now®, Jira®, etc. for managing updation of the application source code. Further, management of container base images is also carried out to ensure that the base images used to generate application container images are secure and are not associated with any vulnerabilities.

In an embodiment of the present invention, a first workflow, as illustrated in FIG. 3a, is executed, which relates to defining and implementing organizational standards for detecting best practices violation associated with the cloud platform deployment configuration files of the application source code in the source code repository 112. In an embodiment of the present invention, detecting best practices violation associated with the cloud platform deployment configuration files of the application source code is carried out based on a first set of pre-defined rules. The first set of pre-defined rules include determining presence of a value (e.g., variables not to be defined in deployment YAML), absence of a value (e.g., readiness probe to be present in Kubernetes® deployment YAML), a value to be within a range, a value to be an exact match, a value to match a wild card and a value to be one of multiple values. In an embodiment of the present invention, implementation of the first set of pre-defined rules is managed by the organization standards manager 124. In another embodiment of the present invention, the first set of pre-defined rules may be evaluated at a pre-defined time-period, such as, daily, weekly, monthly, etc. by the scheduler 132. In an embodiment of the present invention, the notifier 118 is configured to transmit one or more notifications to the user device 110. The transmission of the notification occurs subsequent to a determination that best practices associated with the organizational standards are violated.

In an exemplary embodiment of the present invention, the first set of pre-defined rules may include identifying a dockerfile, carry out a check to determine if the application source code has been fetched from the source code repository 112, defining the source code repository 112 to which the first set of predefined rules is applicable (e.g., all repositories or specific repositories). In a first exemplary usage scenario, an organization standard may be defined such that all the application source code need to be fetched from the source code repository 112 associated with the organization.

In an embodiment of the present invention, a second workflow, as illustrated in FIG. 3b, is implemented which relates to evaluating organizational standards for detecting best practices violation associated with the application source code in the source code repository 112, based on a second set of pre-defined rules. Evaluation of the organizational standards is carried out at a pre-defined time-period by the scheduler 132. The second set of pre-defined rules includes defining the stakeholder (e.g., repository owner or a compliance team) to whom the notification associated with violation of best practices associated with the application source code needs to be reported and defining a time-period at which the first set of pre-defined rules needs to be evaluated. The second set of pre-defined rules is collated by the organizational standards manager 124 for evaluating organizational standards associated with the best practices violation. Further, the source code repository 112 against which organizational standards needs to be evaluated are collated by the configuration manager 126. The second set of pre-defined rules is evaluated against the source code repository 112 by the rule engine 122. Further, notifications related to violations of the best practices are sent to the stakeholders by the notifier 118. Further, a report of violations of best practices is generated and rendered on the dashboard via the UI on the user device 110. In a second exemplary usage scenario, the organizational standard related to violation of best practices is evaluated against all the defined repositories and the violations are reported to the stakeholders and the report is rendered on the UI.

In an embodiment of the present invention, a third workflow, as illustrated in FIG. 3c, is implemented which relates to searching the source code repository 112 for determining best practices violations associated with the application source code based on a third set of pre-defined rules. An ad-hoc search for cloud configuration is carried out in the source code repository 112 based on a search criterion. Further, multiple search criteria may be combined for selecting the source code repository 112. The search results may be saved and notified to the stakeholders by the notifier 118. The search criteria are executed periodically to generate a report and inform the respective stakeholders. In a third exemplary usage scenario, a limit introduced on fetching of the cloud deployment configuration files of the application source code from the source code repository 112 is indicative of disruption in the production applications deployed in Kubernetes®. In order to prevent such a disruption, all the application source code generation configuration files are identified and deployments in Kubernetes® that are involved in fetching cloud deployment configuration files of the application source code from the source code repository 112 across all its applications' source code, which are hosted in the source code repository 112, are also identified. The ad-hoc search may be used to search all application source code build configuration files and deployment YAML files in which application source code is referenced from the source code repository 112.

In an embodiment of the present invention, a fourth workflow, as illustrated in FIG. 3d, is implemented by the workflow unit 152 which relates to importing search sets for handling e-mails and alerts for best practices violation associated with the application source code present in the source code repository 112 based on a fourth set of pre-defined rules. Cloud providers send notifications periodically or have alerts in their portals associated with best practices violations, such as, issues, upgrades, fixes to infrastructure and official base images. These emails and alerts need to be responded to necessary action taken. The criterion to identify the applications impacted due to these notifications and alerts and the action to be taken may be consolidated and exported as a search set. The search set may be exported to the engine 104 in the form of a file. The file is uploaded in the engine 104 and source code repositories 112 which need to be evaluated are chosen. Once imported, the search criteria are scheduled for evaluation. At the scheduled time, the engine 104 evaluates the source code repository 112 against the search criterion and creates a report and sends it to the respective stakeholders. The reports are rendered on the dashboard via the UI on the user device 110.

In a fourth exemplary usage scenario, a cloud provider sends an e-mail to an organization informing that the version of database instance used by the organization has to be upgraded within a pre-defined time-period. If the upgrade is not done by the pre-defined time-period, which is indicated in the e-mail, the cloud provider will automatically upgrade the database instance, which may introduce incompatibilities in the database resulting in the disruption of production applications. To prevent such incompatibilities, the database instances impacted by this upgrade are identified and the stakeholders are notified, and further the upgrade is tracked to closure via a dashboard rendered on the user device 110. The search set for identifying the database is created once and distributed to all subscribed organizations. The organizations thereafter download the search sets, upload them into the engine 104, which provides for searching the database instances impacted, notifying the stakeholders, and creating a dashboard.

In an embodiment of the present invention, a fifth workflow, as illustrated in FIG. 3e, is implemented which relates to adding a new base image to the container registry 154 based on a fifth set of pre-defined rules. The fifth set of rules include rules generated based on a user request. Adding of new base image to the container registry 154 is carried out firstly by generating a request by a requestor. Further, one or more checks are carried out for the new base image including, but are not limited to, determining if the base image is from an approved list of external registries, determining if there is a signature associated with the base image and determining if the signature associated with the base image is valid. Further, the request is queued up for approval for adding the new base image along with the result of the checks carried out. An email is triggered for approval for adding the new base image. Further, a list of requests is displayed via the UI for approval or rejection via the engine 104. In the event the request is rejected, the requestor is notified through an email. In the event the request is approved, the container registry 154 creates a configuration for the new base image which is derived based on a template configured in the container registry 154. The configuration may include, but is not limited to, a dockerfile and metadata related to the base image.

In an embodiment of the present invention, the engine 104 is configured to create a pipeline on the CI/CD unit 150 which pulls the base image from the container registry 154, run scans on the base image for detecting vulnerabilities. In an exemplary embodiment of the present invention, the engine 104 then triggers the pipeline. In another exemplary embodiment of the present invention, the pipeline is triggered during every subsequent pull request for the configuration change of the base image. In the event the scans do not detect any vulnerabilities associated with the base images, then the final base image is generated, signed, and pushed to the container registry 154. In the event the scans detect any vulnerabilities, then the requestor is notified for remediating the vulnerabilities by updating the relevant artifact (dockerfile, etc.) and pushing the updates to the container registry 154. The pipeline runs the scans again and if no vulnerabilities associated with the base image are found, then the pipeline generates the final base image and pushes it to the container registry 154. In a scenario, if it is not feasible to remediate some of the vulnerabilities and if the risk of the vulnerability is low, an exception request may be raised which is reviewed by the administrative users. If the exception request is approved, the final base image is built and pushed to the container registry 154. If the exception requested is rejected, then the process is pushed back for remediation of the base image. Further, the final base image is generated using the configuration found in the source code repository 112 by pulling the base image specified in the configuration and checking the signature of the base image in an external registry.

In a fifth exemplary usage scenario, the engine 104 identifies all the base images used by the applications across the organization. Further, the engine 104 identifies the original source registry of the base images. The engine 104 further establishes an internal secured container registry 154 for hosting secured and updated base images. The engine 104 may use this information for adding the new base images to the container registry 154 and providing a new location of the added base images to the developers.

In an embodiment of the present invention, a sixth workflow, as illustrated in FIG. 3f, is implemented which relates to upgrading versions of the existing base images present in the container registry 154 based on a sixth set of pre-defined rules. The image reconciler unit 148 of the engine 104 periodically performs a check for new version of base images. If it is determined that a new version of a particular base image is available, then the image reconciler unit 148 is configured to trigger the sixth workflow to update the base image in the container registry 154 with the new version and a pull request is created by the image reconciler unit 148. The pull request triggers the pull base image pipeline. A scan is performed, if the scan does not detect any vulnerabilities associated with the base images, then the final base image is built, signed, and pushed to the container registry 154. In the event the scan detects vulnerabilities associated with the base images, then the requestor is notified for remediating the vulnerabilities in the relevant artifact (dockerfile, etc.) and updating the container registry 154. The pipeline runs the scan again and if there are no vulnerabilities, the final base image is generated and upgraded in the container registry 154. Further, if it is not possible to remediate some of the vulnerabilities and if the risk of the vulnerability is low, then the requestor may ask for an exception. If the exception request is approved, the final base image is generated and upgraded in the container registry 154. If the exception is rejected, the process is pushed back for remediation of the base image. Further, a final base image is generated using the configuration found in the source code repository 112 by fetching the base image specified in the configuration and checking the signature of the base image in the external registry. After the base image is upgraded in the container registry 154, all the stakeholders using that base image are notified. In a sixth exemplary usage scenario, upgrade of the version of an existing base image triggers the base image upgrade workflow. Once the upgrade workflow is completed, all the stakeholders of the applications that are using the base image are notified of the new upgraded version of the base image.

In an embodiment of the present invention, a seventh workflow, as illustrated in FIG. 3g, is implemented which relates to deprecation of an old version of base images present in the container registry 154 based on a seventh set of pre-defined rules. The versions of base images used in configuration files in the source code repository 112 are scanned periodically. In the event it is determined that the latest version of a base image is updated significantly, then older versions of the base image are deprecated. Once older versions of the base image are identified, the crawler 116 parses through the application source code in the source code repository 112 to determine if the deprecated version of that base image is used in generation of the application container image. If a deprecated version of the base image is identified, then the stakeholders are notified. The configuration for the application container image generation is updated to use the next version/latest version that is not deprecated and a pull request is created in the source code repository 112. Further, subsequent to removal of all the old version of the base image from the configuration of all application containers, the deprecated versions of the base image are moved to an archive registry which is accessible by certain users only. The older version of the base image is deleted in the active container registry 154 such that the applications are not able to use the older version of the base image in future.

In a seventh exemplary usage scenario, certain versions of base images are deprecated as they may have expired. The maintainers of that base image may not support that version to fix security vulnerabilities. In such a scenario, the applications using the older version of the base image need to upgrade the version to a latest version or to a later version which is still being supported. The stakeholders are notified and the upgrade of the version of the base image is tracked.

Figure 4:
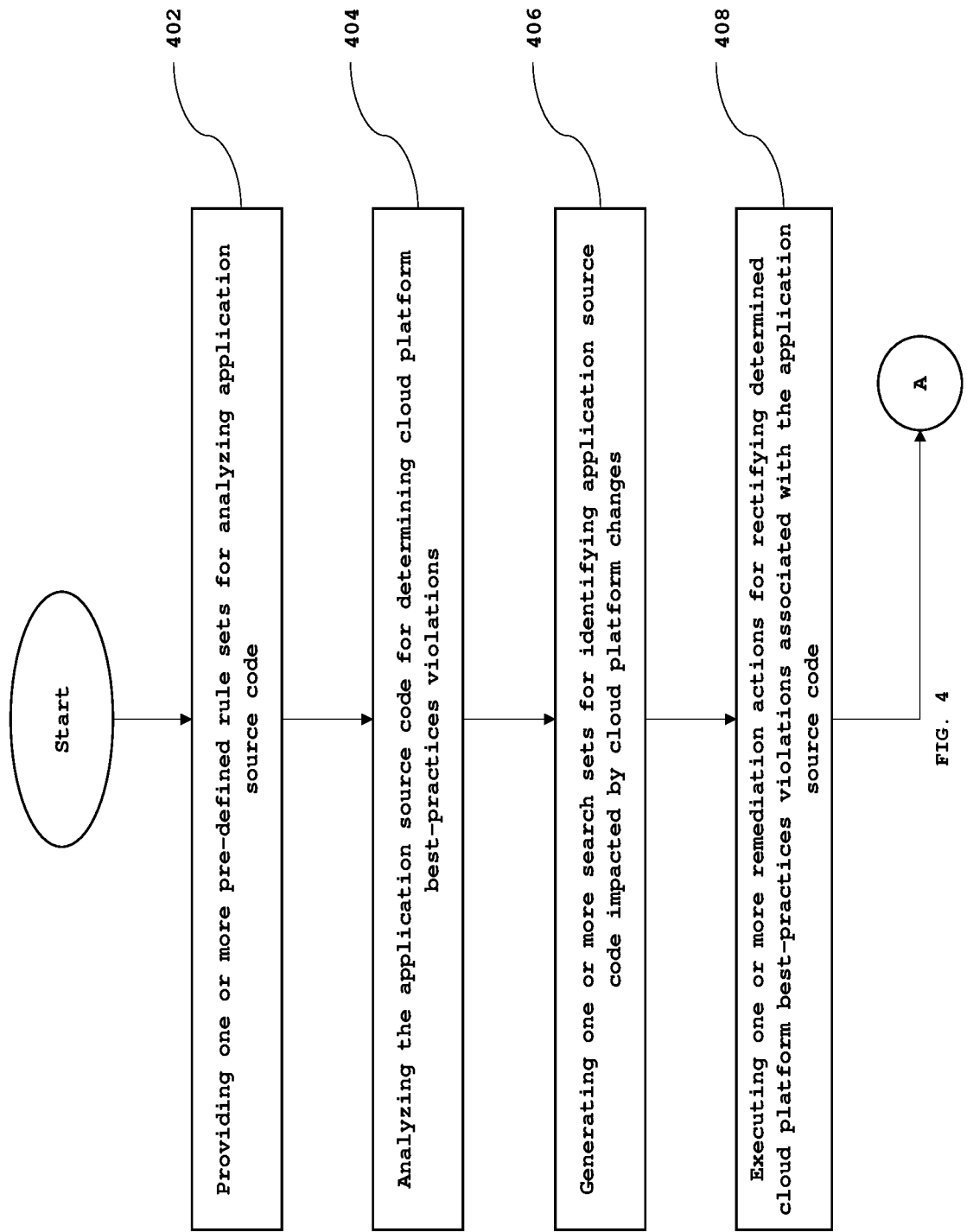
FIG. 4 and FIG. 4A illustrate a flowchart depicting a method for automatically managing cloud platform deployment configuration files and container base images, in accordance with an embodiment of the present invention.
Figure 4A:
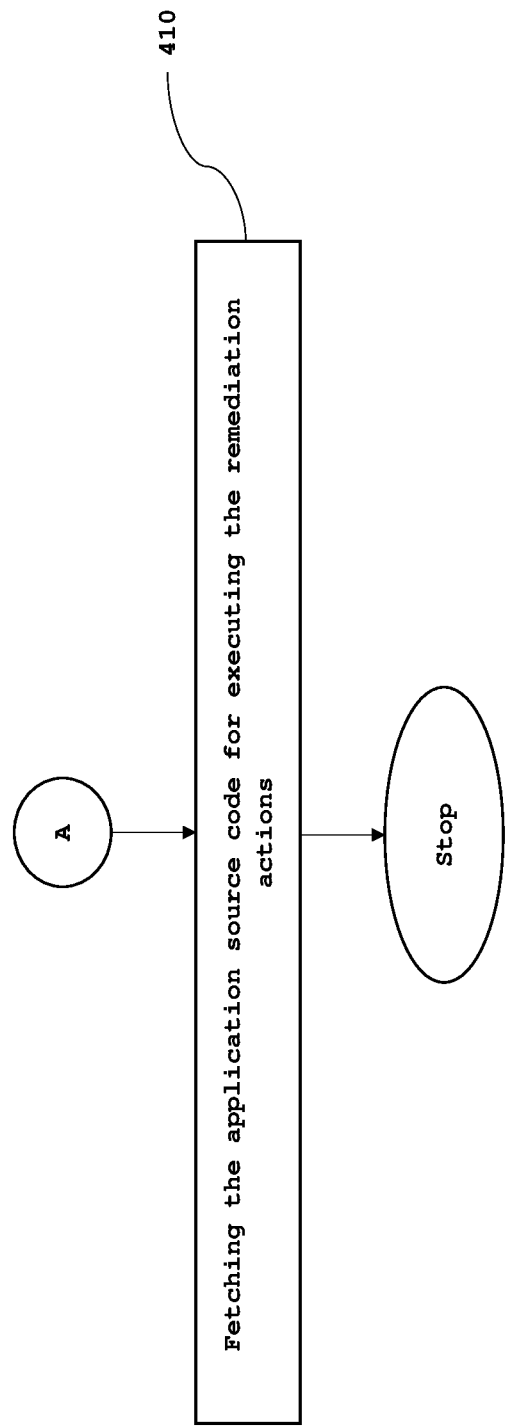

FIG. 4 and FIG. 4A illustrate a flowchart depicting a method for automatically managing cloud platform deployment configuration files and container base images, in accordance with various embodiments of the present invention.

At step 402, one or more pre-defined rule sets are provided for analyzing the application source code. In an embodiment of the present invention, the pre-defined rule sets are used for determining and flagging cloud platform best-practice violations for the application source code associated with the configuration files and container images. In an exemplary embodiment of the present invention, the rule sets are a group of rules specific to the organization. In an embodiment of the present invention, the pre-defined rule sets are generated based on inputs provided via the actionable UI. In another embodiment of the present invention, the pre-defined rule sets may be pre-defined by using ML techniques. In an example, the pre-defined rule sets analyzing the application source code may relate to, but are not limited to, identifying the applications in which the base image in dockerfile is pulled from docker hub, recognizing one or more issues with deployment which are used to push applications to upgraded versions of platforms, such as Kubernetes®, that may impact the application source code and may lead to cloud platform best-practice violations.

In an embodiment of the present invention, the cloud platform best-practice violations notifications received from the cloud platform provider are analyzed for converting the notifications into the one or more pre-defined rule sets. In an embodiment of the present invention, the emails, and alerts, related to cloud platform changes, sent in the form of notifications by the cloud platform provider are analyzed. The received notifications are analyzed by using ML techniques for converting the notifications into the one or more pre-defined rule sets, which are used for determining the cloud platform best-practice violations associated with the application source code. In another embodiment of the present invention, the stored pre-defined rule sets are fetched based on analysis of the notifications received from the cloud platform for determining the cloud platform best-practice violations associated with the application source code.

At step 404, the application source code is analyzed for determining cloud platform best-practice violations. In an embodiment of the present invention, the application source code is analyzed, at regular time intervals, using the one or more pre-defined rule sets for determining the cloud platform best-practice violations associated with the application source code. The determined cloud platform best-practice violations are notified to the users via the actionable UI.

In an embodiment of the present invention, transmission of the stored pre-defined rule sets is managed for analyzing the application source code and determining the cloud platform best-practice violations associated with the application source code. In an embodiment of the present invention, grouping of the pre-defined rule sets is managed based on one or more pre-defined criteria. Examples of pre-defined criteria may include, but are not limited to, a criterion that base images in container-based deployment configuration files may not refer to public container image registries and a criterion that health check may be enabled for all applications in their respective deployment configuration files.

In an embodiment of the present invention, the pre-defined rule sets are specified, in the event and if any application source code may be excluded from the analysis or not. In an embodiment of the present invention, search operation on the application source code is periodically executed based on the pre-defined rule sets for searching and evaluating the pre-defined rule sets based on the determined and flagged cloud platform best-practice violations associated with the application source code.

At step 406, one or more search sets are generated for identifying application source code impacted by cloud platform changes. In embodiment of the present invention, one or more inputs are transmitted via the actionable UI for generating one or more search sets. For example, the inputs used for generating search sets may include, but are not limited to, file types and Regex for identifying best practice violation associated with the organizational standards for cloud deployment of the applications. The search sets are rules defined to identify application source code associated with the best practice violations caused by cloud platform changes, which are initiated by the cloud platform provider. The cloud platform changes may include, but are not limited to, cloud platform infrastructure changes, bug fixes and errata. The cloud platform change is generally notified to the user in the organization by the cloud platform provider using one or more notification modes such as, but are not limited to, email and alerts in a cloud platform provider's portal.

At step 408, one or more remediation actions are executed for rectifying determined cloud platform best-practice violations associated with the application source code. In an embodiment of the present invention, one or more remediation actions are executed on the application source code associated with the configuration files and container images with respect to the determined cloud platform best-practice violations associated with the impacted application source code for rectifying the determined cloud platform best-practice violations. For example, the remediation actions may include, but are not limited to, search for container-based cloud platform deployment configuration file in which the base image is referring to a public registry, identify the equivalent base image in the internal registry and update the configuration file. In an embodiment of the present invention, the remediation action is provided based on one or more remediation types associated with the remediation action. The remediation types represent the execution of the one or more remediation actions. In an embodiment of the present invention, the remediation action is automatically executed on the application source code for rectifying the determined cloud platform best-practice violations associated with the application source code. In another embodiment of the present invention, the remediation action is provided via the actionable UI for visualization and the remediation action may be suitably carried out for rectifying the determined cloud platform best-practice violations associated with the application source code. In an embodiment of the present invention, the remediation action is applied directly to the application source code for rectifying the determined cloud platform best-practice violations associated with the application source code.

At step 410, the application source code is fetched for executing the remediation action. In an embodiment of the present invention, the application source code associated with cloud platform best-practice violations are fetched for remediating the cloud platform best-practice violations associated with the application source code. The application source code associated with cloud platform best-practice violations are fetched based on a pull request generated by the users. Further, based on the pull request, the application source code associated with cloud platform best-practice violations are fetched from the source code repository. Further, remediation actions are applied on the fetched application source code for rectifying identified cloud platform best-practice violations and a status regarding 'success' or 'no success' of application of the remediation action is generated and sent via the actionable UI for visualization by the user in the organization. Further, the pull request triggers a test run to determine that the changes made to the application code based on the remediation action, have not removed any functionality associated with the application source code. Further, the test run may be executed to verify cloud platform deployment configuration to determine if any of the best practices have been violated or not.

In an embodiment of the present invention, a pipeline is created to validate the base image prior to storing the container base images in the container registry. The base images are validated by scanning to check if there are any vulnerabilities associated with them using tools such as Snyk®, and Clair®. In an embodiment of the present invention, one or more tools such as Jenkins®, Spinnaker®, Tekton®, Concourse®, Bamboo®, etc., are used to carry out CI/CD operations such as, create, modify, and trigger pipelines.

In an exemplary embodiment of the present invention, one or more workflows are implemented for determining cloud platform best-practice violations or best practices violations associated with the cloud platform deployment configuration files of the application source code in the source code repository. In an exemplary embodiment of the present invention, one or more workflows are implemented for management of the container base images present in the container registry. In yet another exemplary embodiment of the present invention, one or more workflows are implemented for generation of base images. In an embodiment of the present invention, application source code version of existing application source code is updated, and one or more workflows are triggered when the application source code is updated with a new version.

In an embodiment of the present invention, a first workflow is executed which relates to defining and implementing organizational standards for detecting best practices violation associated with the cloud platform deployment configuration files of the application source code in the source code repository 112. In an embodiment of the present invention, detecting best practices violation associated with the application source code is carried out based on a first set of pre-defined rules. The first set of pre-defined rules include determining presence of a value (e.g., variables not to be defined in deployment YAML), absence of a value (e.g., readiness probe to be present in Kubernetes® deployment YAML), a value to be within a range, a value to be an exact match, a value to match a wild card and a value to be one of multiple values. In another embodiment of the present invention, the first set of pre-defined rules may be evaluated at a pre-defined time-period, such as, daily, weekly, monthly, etc. In an embodiment of the present invention, one or more notifications are transmitted. The transmission of notification occurs after a determination that best practices associated with the organizational standards are violated.

In an embodiment of the present invention, a second workflow is implemented which relates to evaluating organizational standards for detecting best practices violation associated with the application source code based on a second set of pre-defined rules. Evaluation of the organizational standards is carried out at a pre-defined time-period. The second set of pre-defined rules includes defining the stakeholder (e.g., repository owner or a compliance team) to whom the notification associated with violation of best practices associated with the application source code need to be reported and defining a time-period at which the first set of pre-defined rules needs to be evaluated. The second set of pre-defined rules is collated for evaluating organizational standards associated with the best practices violation. Further, notifications related to violations of the best practices are sent to the stakeholders. Further, a report of violations of the best practices is generated and rendered on the dashboard via the UI.

In an embodiment of the present invention, a third workflow is implemented which relates to searching source code repository for determining best practices violations associated with the application source code based on a third set of pre-defined rules. An ad-hoc search for cloud configuration is carried out in the source code repository based on a search criterion. Further, multiple search criteria may be combined for selecting the source code repository. The search results may be saved and notified to the stakeholders. The search criteria are executed periodically to generate a report and inform the respective stakeholders.

In an embodiment of the present invention, a fourth workflow is implemented which relates to importing search sets for handling e-mails and alerts for best practices violation associated with the application source code present in the source code repository based on a fourth set of pre-defined rules. Cloud providers send notifications periodically or have alerts in their portals associated with best practices violations, such as issues, upgrades, fixes to infrastructure and official base images. These emails and alerts need to be responded to necessary action taken. The criterion to identify the applications impacted due to these notifications and alerts and the action to be taken may be consolidated and exported as a search set. The search set may be exported to the engine in the form of a file. The file is to be uploaded in the engine and a set of source code repositories which need to be evaluated has to be chosen. Once imported, the search criteria are scheduled for evaluation. At the scheduled time, the engine evaluates the source code repository against the search criterion and creates a report and sends it to the respective stakeholders. The reports are rendered on the dashboard via the UI.

In an embodiment of the present invention, a fifth workflow is implemented which relates to adding a new base image to the container registry based on a fifth set of pre-defined rules. The fifth set of rules include rules generated based on a user request. Adding of new base image to the container registry is carried out firstly by generating a request by a requestor. Further, one or more checks are carried out for the new base image including, but are not limited to, determining if the base image is from an approved list of external registries, determining if there is a signature associated with the base image and determining if the signature associated with the base image is valid. Further, the request is queued up for approval for adding the new base image along with result of the checks carried out. An email is triggered for approval for adding the new base image. Further, a list of requests is displayed via the UI for approval or rejection via the engine. In the event the request is rejected, the requestor is notified through an email. In the event the request is approved, the first orchestrator creates a configuration for the new base image which is derived based on a template configured in the source code repository. The configuration may include, but is not limited to, a dockerfile and metadata related to the base image.

In an embodiment of the present invention, the engine is configured to create a pipeline which pulls the base image from the container registry, run scans on the base image for detecting vulnerabilities. The engine then triggers the pipeline. The pipeline is also triggered during every subsequent pull request for the configuration change of the base image. In the event the scans do not detect any vulnerabilities associated with the base images, then the final base image is generated, signed, and pushed to the container registry. In the event the scans detect any vulnerabilities, then the requestor is notified for remediating the vulnerabilities in by updating the relevant artifact (dockerfile, etc.) and pushing the updates to the container registry. The pipeline runs the scans again and if no vulnerabilities associated with the base image are found, then the pipeline generates the final base image and pushes it to the container registry. In a scenario, if it is not feasible to remediate some of the vulnerabilities and if the risk of the vulnerability is low, an exception request may be raised which is reviewed by the administrative users. If the exception request is approved, the final base image is built and pushed to the container registry. If the exception requested is rejected, then the process is pushed back for remediation of the base image. Further, the final base image is generated using the configuration found in the source code repository by pulling the base image specified in the configuration and checking the signature of the base image in an external registry.

In an embodiment of the present invention, a sixth workflow is implemented which relates to upgrading versions of the existing base images present in the container registry based on a sixth set of pre-defined rules. Periodically a check is performed for new version of base images. If it is determined that a new version of a particular base image is available, then the base image is updated in the container registry with the new version and a pull request is created. The pull request triggers the pull base image pipeline. A scan is performed, if the scan does not detect any vulnerabilities associated with the base images, then the final base image is built, signed, and pushed to the container registry. In the event the scan detects vulnerabilities associated with the base images, then the requestor is notified for remediating the vulnerabilities in the relevant artifact (dockerfile, etc.) and updating container registry. The pipeline runs the scan again and if there are no vulnerabilities, the final base image is generated and upgraded in the container registry. Further, if it is not possible to remediate some of the vulnerabilities and if the risk of the vulnerability is low, then the requestor may ask for an exception. If the exception request is approved, the final base image is generated and upgraded in the container registry 154. If the exception is rejected, the process is pushed back for remediation of the base image. Further, a final base image is generated using the configuration found in the source code repository by fetching the base image specified in the configuration and checking the signature of the base image in the external registry. After the base image is upgraded in the container registry, all the stakeholders using that base image are notified.

In an embodiment of the present invention, a seventh workflow is implemented which relates to deprecation of old version of base images present in the source code repository based on a seventh set of pre-defined rules. The versions of base images in the container registry are scanned periodically. In the event it is determined that the latest version of a base image is updated significantly, then older versions of the base image are deprecated. Once such a version of the base image is identified, the container registry is parsed to determine if the deprecated version of that base image is used in generation of the application container image. If a deprecated version of the base image is identified, then the stakeholders are notified. The configuration for the base image generation is updated to use the next version/latest version that is not deprecated and a pull request is created in the source code repository. Further, subsequent to removal of all the old version of the base image from the configuration of all application containers, the deprecated versions of the base image are moved to an archive registry which is accessible by certain users only. The older version of the base image is deleted in the active registry such that the applications are not able to use the older version of the base image in future.

Advantageously, in accordance with various embodiments of the present invention, the present invention provides for efficiently managing cloud platform deployment configuration files and container base images associated with applications. The present invention aids an organization to define standards and best practices for managing cloud platform deployment configuration files and container base images associated with the application source code. The present invention provides for continually analyzing application source code and cloud platform deployment configuration of the application source code. The present invention aids organizations to resolve cloud platform best-practice violations of the application flagged by the cloud platform provider by searching for applications that cause of violations, informing the team in the organization managing the said applications regarding violations and confirming remediation of the cloud platform violation by the application source code. Further, the managing of cloud platform violations of the applications aids in effective production of applications. Furthermore, the present invention provides for visualization, via the actionable UI, of all the cloud platform best-practice violations by the applications and remediation actions taken. Further, the present invention provides for monitoring and managing the container's base image updates, irrespective of its source, thereby reducing the risk of security issues. Furthermore, the present invention provides for automating operational overhead of frequent and on-time security updates of the base images and container images of applications. The present invention further provides for managing the end-to-end process of container base image update. Yet further, the present invention provides for eliminating the need to build all the base images from scratch by providing a defined workflow to define, import and implement base images from their respective source repositories.

Figure 5:
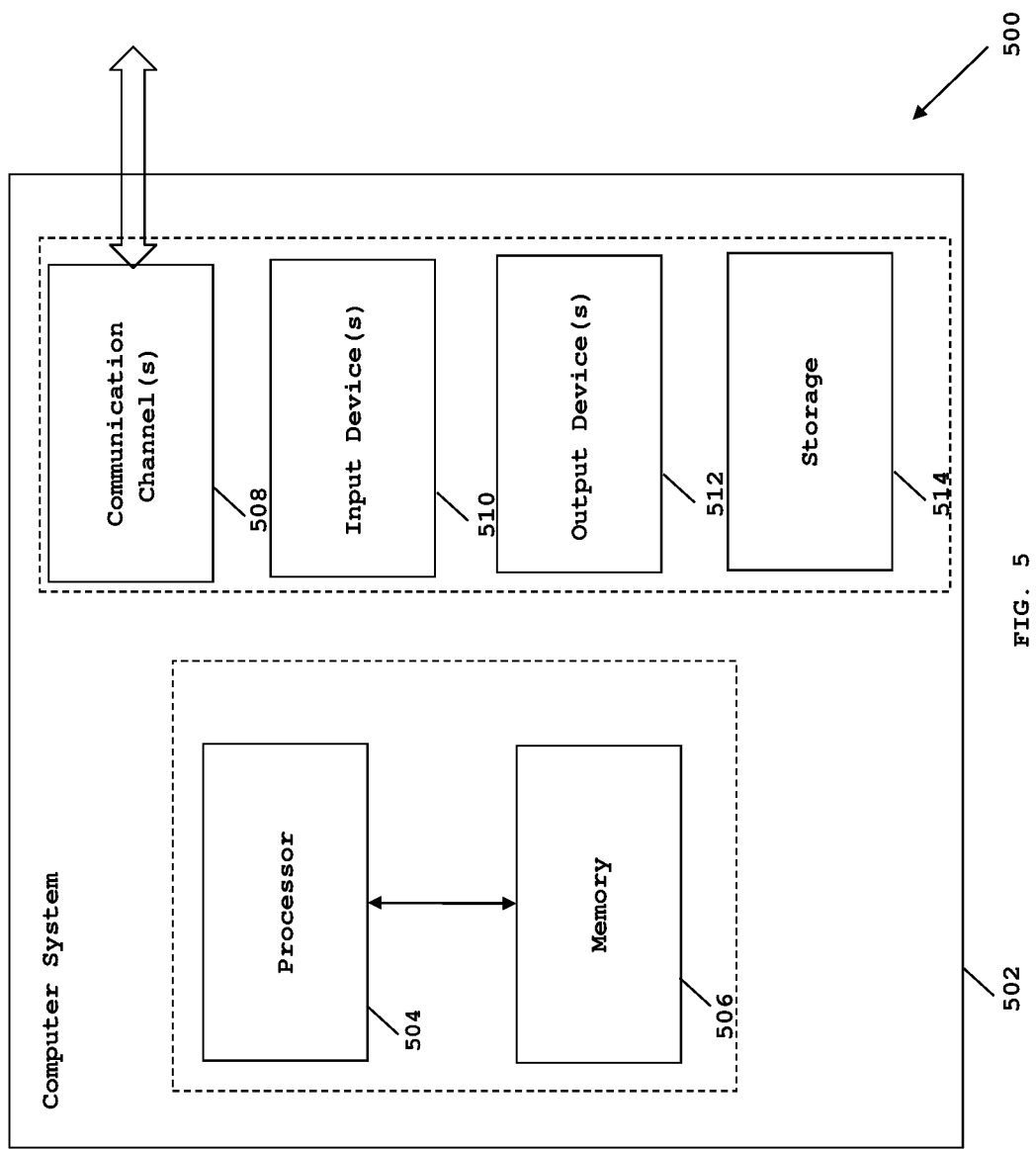
FIG. 5 illustrates an exemplary computer system in which various embodiments of the present invention may be implemented.

FIG. 5 illustrates an exemplary computer system in which various embodiments of the present invention may be implemented. The computer system 502 comprises a processor 504 and a memory 506. The processor 504 executes program instructions and is a real processor. The computer system 502 is not intended to suggest any limitation as to scope of use or functionality of described embodiments. For example, the computer system 502 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 506 may store software for implementing various embodiments of the present invention. The computer system 502 may have additional components. For example, the computer system 502 includes one or more communication channels 508, one or more input devices 510, one or more output devices 512, and storage 514. An interconnection mechanism (not shown) such as a bus, controller, or network, interconnects the components of the computer system 502. In various embodiments of the present invention, operating system software (not shown) provides an operating environment for various softwares executing in the computer system 502 and manages different functionalities of the components of the computer system 502.

The communication channel(s) 508 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth, or other transmission media.

The input device(s) 510 may include, but not limited to, a keyboard, mouse, pen, joystick, trackball, a voice device, a scanning device, touch screen or any another device that is capable of providing input to the computer system 502. In an embodiment of the present invention, the input device(s) 510 may be a sound card or similar device that accepts audio input in analog or digital form. The output device(s) 512 may include, but not limited to, a user interface on CRT or LCD, printer, speaker, CD/DVD writer, or any other device that provides output from the computer system 502.

The storage 514 may include, but not limited to, magnetic disks, magnetic tapes, CD-ROMs, CD-RWs, DVDs, flash drives or any other medium which can be used to store information and can be accessed by the computer system 502. In various embodiments of the present invention, the storage 514 contains program instructions for implementing the described embodiments.

The present invention may suitably be embodied as a computer program product for use with the computer system 502. The method described herein is typically implemented as a computer program product, comprising a set of program instructions which is executed by the computer system 502 or any other similar device. The set of program instructions may be a series of computer readable codes stored on a tangible medium, such as a computer readable storage medium (storage 514), for example, diskette, CD-ROM, ROM, flash drives or hard disk, or transmittable to the computer system 502, via a modem or other interface device, over either a tangible medium, including but not limited to optical or analogue communications channel (s) 508. The implementation of the invention as a computer program product may be in an intangible form using wireless techniques, including but not limited to microwave, infrared, Bluetooth, or other transmission techniques. These instructions can be preloaded into a system or recorded on a storage medium such as a CD-ROM or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the scope of the invention.

We claim:

1. A system for managing cloud deployment configuration files and container base images for applications, the system comprises:
   a memory storing program instructions;
   a processor executing program instructions stored in the memory; and
   a cloud platform deployment management engine executed by the processor and configured to:
      analyze one or more application source code associated with configuration files and container images of applications based on one or more pre-defined rule sets for determining cloud platform best-practice violations associated with the application source code;
      identify impact on the application source code due to cloud platform changes based on one or more search sets;
      execute one or more remediation actions for rectifying the determined cloud platform best-practice violations associated with the impacted application source code based on one or more remediation types, wherein base images of the container images are validated to be secure and without vulnerabilities; and
      trigger a test run to determine that the remediation actions have not removed functionalities associated with the application source code.

2. The system as claimed in claim 1, wherein the cloud platform deployment management engine comprises a rule engine executed by the processor and configured to provide the one or more pre-defined rule sets based on one or more of inputs received via an actionable UI on a user device, and wherein the pre-defined rule sets include defining a docker hub rate limit for extracting base source code images from the docker hub and using the extracted base source code image for identifying the impacted application source code, recognizing one or more issues with upgraded versions of platforms that impact the application source code and lead to cloud platform compliance violations.

3. The system as claimed in claim 2, wherein the cloud platform deployment management engine comprises a notification processor executed by the processor and configured to analyze emails and alerts associated with notifications of cloud platform changes based on machine learning techniques for converting the notifications into the pre-defined rule sets in communication with the rule engine, and wherein the notification processor is configured to communicate with the rule engine for fetching the pre-defined rule sets stored in a data storage unit based on analysis of the notifications received from the cloud platform provider for determining the cloud platform best-practice violations associated with the application source code.

4. The system as claimed in claim 2, wherein the rule engine receives one or more inputs from the user device via the actionable UI for generating the one or more search sets, and wherein the inputs comprise file types and Regex for identifying violation of best practices associated with the organizational standards for cloud deployment of the configuration files and container images.

5. The system as claimed in claim 1, wherein the cloud platform deployment management engine comprises a crawler executed by the processor and configured to analyze the application source code stored in a source code repository, at regular time intervals, based on the pre-defined rule sets for determining the cloud platform best-practice violations associated with the application source code.

6. The system as claimed in claim 1, wherein the cloud platform deployment management engine comprises an organization standards manager executed by the processor and configured to manage grouping of the pre-defined rule sets based on one or more pre-defined criteria, and wherein the pre-defined criteria includes a criterion that the base images in container based deployment configuration files do not refer to public container image registries, and a criterion for enabling health check for all applications in respective deployment configuration files.

7. The system as claimed in claim 1, wherein the cloud platform deployment management engine comprises a scheduler executed by the processor and configured to periodically execute a search operation on the application source code present in a source code repository based on the pre-defined rule sets stored in a data storage unit in communication with a rule engine for searching and evaluating the pre-defined rule sets based on the determined cloud platform best-practice violations associated with the application source code.

8. The system as claimed in claim 1, wherein the cloud platform deployment management engine comprises a remediation unit executed by the processor and configured to automatically execute the one or more remediation actions for rectifying the determined cloud platform best-practice violations via an actionable UI on a user device, and wherein the remediation action is applied directly to the application source code.

9. The system as claimed in claim 8, wherein the remediation unit is configured to fetch the application source code associated with the determined cloud platform best-practice violations from a source code repository based on a pull request generated by a user and communicated through a web hook unit, and wherein the remediation action is applied by the remediation unit on the application source code.

10. The system as claimed in claim 1, wherein the system comprises a continuous integration and continuous deployment (CI/CD) unit configured to create a pipeline to validate the base images prior to storing the base images in a container registry by scanning to check if there are any vulnerabilities associated with the base images.

11. The system as claimed in claim 1, wherein the system comprises a workflow unit configured to implement one or more workflows for determining violation of best practices associated with the cloud platform deployment configuration files for the application source code present in a source code repository and management of the container images present in a container registry, and wherein the cloud platform deployment management engine comprises a second orchestrator executed by the processor and configured to manage implementation of the one or more workflows via an actionable UI.

12. The system as claimed in claim 11, wherein the cloud platform deployment management engine comprises an image reconciler unit executed by the processor and configured to update versions of existing application source code in the source code repository and trigger a workflow when the application source code is updated with a new version, and wherein the image reconciler unit is configured to manage updates of the base images in the container registry.

13. The system as claimed in claim 11, wherein the workflow unit is configured to implement a first workflow for defining and implementing organizational standards for detecting violation of best practices based on a first set of pre-defined rules, the first set of pre-defined rules sets are evaluated at a pre-defined time-period by a scheduler.

14. The system as claimed in claim 13, wherein the first set of pre-defined rules include, presence of a value, absence of a value, a value within a range, a value be an exact match, a value to match a wild card and a value be one of multiple values, identifying a docker file, defining the source code repository to which the first set of pre-defined rule is applicable.

15. The system as claimed in claim 11, wherein the workflow unit is configured to implement a second workflow for evaluating organizational standards in order to detect the violation of best practices associated with the application source code in the source code repository based on a second set of pre-defined rules, and wherein the organizational standards are evaluated against the source code repository at a pre-defined time-period by a scheduler in the cloud platform deployment management engine.

16. The system as claimed in claim 15, wherein the second set of pre-defined rules include defining stakeholders to whom notification associated with the violation of best practices associated with the application source code is to be reported and defining a time-period at which the first set of pre-defined rules is to be evaluated.

17. The system as claimed in claim 11, wherein the workflow unit is configured to implement a third workflow associated with searching the source code repository for determining violation of the best practices associated with the application source code based on a third set of pre-defined rules, and wherein an ad-hoc search for cloud configuration is carried out based on a search criterion for selecting the source code repository, and wherein multiple search criteria are combined for selecting the source code repository.

18. The system as claimed in claim 11, wherein the workflow unit is configured to implement a fourth workflow associated with importing the search sets for handling e-mails and alerts associated with the violation of best practices for the application source code present in the source code repository based on a fourth set of pre-defined rules.

19. The system as claimed in claim 11, wherein the workflow unit is configured to implement a fifth workflow associated with adding a new base image to the container registry based on a fifth set of pre-defined rules associated with a user request, and wherein one or more checks are carried out for the new base image including, determining if the base image is from an approved list of external registries, determining if there is a signature associated with the base image and determining if the signature associated with the base image is valid, and wherein adding of the new base image to the container registry is carried out by generating a request, in the event the request is rejected then a notification is sent through an email, in the event the request is approved the container registry creates a configuration file for the new base image which is derived based on a template configured in the container registry.

20. The system as claimed in claim 11, wherein the workflow unit is configured to implement a sixth workflow associated with upgrading versions of the base images present in the container registry based on a sixth set of pre-defined rules, and wherein an image reconciler unit periodically performs a check for new version of base images, and wherein if it is determined that a new version of a particular base image is available, then the image reconciler unit is configured to trigger the sixth workflow to update the base image in the container registry with the new version.

21. The system as claimed in claim 11, wherein the workflow unit implements a seventh workflow associated with deprecation of old version of base images present in the container registry based on a seventh set of pre-defined rules, and wherein the versions of base images used in the configuration files in the source code repository are scanned periodically, and wherein if it is determined that a latest version of the base images is updated significantly, then old versions of the base images are deprecated.

22. The system as claimed in claim 21, wherein if the old version of the base images are identified then a crawler parses through the application source code in the source code repository to determine if the deprecated versions of that base images are used in generation of the application container image, and wherein the configuration for the application container image generation is updated to use the next version that is not deprecated and a pull request is created in the source code repository subsequent to removal of the old version of the base images from the container registry, the deprecated versions of the base image are moved to an archive registry and the old version of the base images is deleted in the active container registry such that the applications are not able to use the old version of the base images.

23. A method for automatically managing cloud deployment configuration files and container base images for applications, wherein the method is implemented by a processor executing instructions stored in a memory, the method comprises:
analyzing one or more application source code associated with configuration files and container images of applications based on one or more pre-defined rule sets for determining cloud platform best-practice violations associated with the application source code;
identifying impact on the application source code due to cloud platform changes based on one or more search sets;
executing one or more remediation actions for rectifying the determined cloud platform best-practice violations associated with the impacted application source code based on one or more remediation types, wherein base images of the container images are validated to be secure and without vulnerabilities; and
triggering a test run to determine that the remediation actions have not removed functionalities associated with the application source code.

24. The method as claimed in claim 23, wherein the pre-defined rule sets include identifying the applications in which the base images in dockerfile is pulled from docker hub, recognizing one or more issues with deployment of applications to upgraded versions of Kubernetes® that impact the application source code and lead to cloud platform best-practice violations.

25. The method as claimed in claim 23, wherein notifications associated with the cloud platform changes comprising emails and alerts are analyzed using machine learning techniques for converting the notifications into the one or more pre-defined rule sets.

26. The method as claimed in claim 23, wherein the one or more search sets are rules that are generated for identifying the cloud platform changes including cloud platform infrastructure changes, bugs, and errata, and wherein the search sets are generated based on one or more inputs received via an actionable UI comprising file types and Regex for identifying violation of best practices associated with organizational standards.

27. The method as claimed in claim 23, wherein one or more workflows are implemented for determining violation of best practices associated with the cloud platform deployment configuration files for the application source code and management of the container images.

28. The method as claimed in claim 27, wherein a pipeline is created to run scans on the base images for detecting vulnerabilities, and wherein the pipeline is triggered during every subsequent pull request for the base images, and wherein if the scans do not detect vulnerabilities associated with the base images then a final base image is generated, and wherein if scans detect vulnerabilities associated with the base images then a notification is sent and the vulnerabilities are remediated in a relevant artifact.

29. The method as claimed in claim 28, wherein the pipeline runs the scans again and if no vulnerabilities are found then the pipeline generates a final base image, and wherein an exception request is provided if it is determined that the vulnerabilities cannot be remediated and risks associated with the vulnerabilities are low to build a final base image if the exception request is approved, and wherein if the exception requested is rejected then the process is pushed back for remediation of the base image, and wherein a final base image is generated using a configuration by pulling the base image specified in the configuration and checking signature of the base image in an external registry.

30. A computer program product comprising:
a non-transitory computer-readable medium having computer program code stored thereon, the computer-readable program code comprising instructions that, when executed by a processor, causes the processor to:
analyze one or more application source code associated with configuration files and container images of applications based on one or more pre-defined rule sets for determining cloud platform best-practice violations associated with the application source code;
identify impact on the application source code due to cloud platform changes based on one or more search sets;
execute one or more remediation actions for rectifying the determined cloud platform best-practice violations associated with the impacted application source code based on one or more remediation types, wherein base images of the container images are validated to be secure and without vulnerabilities; and
trigger a test run to determine that the remediation actions have not removed functionalities associated with the application source code.

31. The computer program product as claimed in claim 30, wherein one or more checks are carried out for adding a new base image including determining if the new base image is from an approved list of external registries, determining if there is a signature associated with the new base image and determining if the signature associated with the new base image is valid, and wherein adding the new base image is carried out by generating a request, in the event the request is rejected then a notification is sent through an email, in the event the request is approved a configuration file is created for the new base image which is derived based on a template.

* * * * *